United States Patent [19]

Cherukuri et al.

[11] Patent Number: 5,066,511

[45] Date of Patent: Nov. 19, 1991

[54] METHOD FOR PREPARING PULVERIZED POLYDEXTROSE WHICH IS SUBSTANTIALLY FREE OF ACIDS AND COMPOSITIONS CONTAINING SAME

[75] Inventors: Subraman R. Cherukuri, Towaco; Kirshna P. Raman, Randolph, both of N.J.; Lucy L. Wong, Jackson Heights; Gul Mansukhani, Staten Island, both of N.Y.; Angel Orama, Stanhope, N.J.

[73] Assignee: Warner-Lambert Company, Morris Plains, N.J.

[21] Appl. No.: 354,650

[22] Filed: May 19, 1989

[51] Int. Cl.[5] ................ A23L 1/0522; A23G 3/30
[52] U.S. Cl. .................... 426/658; 426/548; 426/96; 426/518; 426/3
[58] Field of Search ............ 426/658, 548, 96, 518; 241/22

[56] References Cited

U.S. PATENT DOCUMENTS

| | | | |
|---|---|---|---|
| 680,889 | 8/1901 | Schutz | 241/22 |
| 1,357,480 | 11/1920 | Schneider | 241/22 |
| 1,968,628 | 7/1934 | Alton | 241/22 |
| 2,617,599 | 11/1952 | Dammers | 241/22 |
| 3,333,776 | 8/1967 | Rauner et al. | 241/22 |
| 3,580,519 | 5/1971 | Klein et al. | 241/22 |
| 3,648,937 | 3/1972 | Ehrreich | 241/22 |
| 3,876,794 | 4/1975 | Rennhard | 426/548 |
| 4,382,963 | 5/1983 | Klose et al. | 426/3 |
| 4,622,233 | 12/1984 | Torres | 426/548 |
| 4,765,991 | 5/1986 | Cherukuri et al. | 426/3 |
| 4,814,195 | 3/1989 | Yokoyama et al. | 426/658 |

OTHER PUBLICATIONS

Polydextrose Research Product Bulletin, Pfizer Central Research, Groton, Conn. (1981), p. 11.

*Primary Examiner*—Jeanette Hunter
*Attorney, Agent, or Firm*—Daniel A. Scola, Jr.; Craig M. Bell

[57] ABSTRACT

The present invention pertains to a method for preparing pulverized Polydextrose having a particle size of under about 125 microns in diameter from Polydextrose which is substantially free of low molecular weight organic acids which comprises the steps of (a) admixing Polydextrose which is substantially free of low molecular weight organic acids with an anti-caking agent to form a mixture, and (b) pulverizing the mixture to form the pulverized Polydextrose. The pulverized Polydextrose composition may be used in a variety of chewing gum products and edible products. The present invention also pertains to methods for preparing the chewing gum and edible products in which the novel composition may be used.

10 Claims, 1 Drawing Sheet

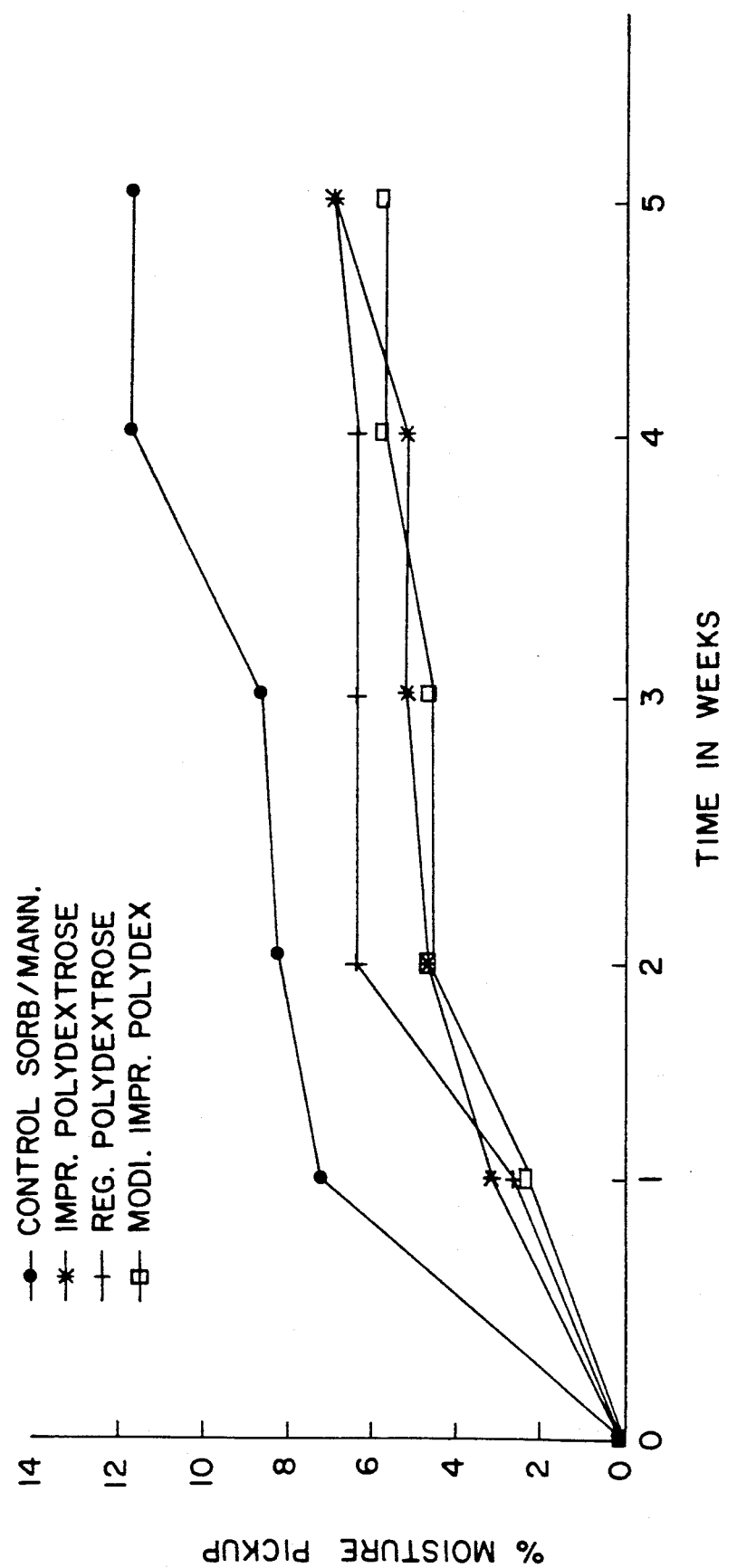

METHOD FOR PREPARING PULVERIZED POLYDEXTROSE WHICH IS SUBSTANTIALLY FREE OF ACIDS AND COMPOSITIONS CONTAINING SAME

BACKGROUND OF THE INVENTION

1. Field of the Invention

This invention relates to a method for preparing pulverized Polydextrose having a particle size of under about 125 microns in diameter. More particularly, the improved method comprises admixing Polydextrose which is substantially free of low molecular weight organic acids with an anti-caking agent and pulverizing the mixture to form the pulverized Polydextrose. The pulverized Polydextrose may be used in a variety of chewing gum products and edible products. The present invention also pertains to methods for preparing the chewing gum and edible products in which the novel pulverized Polydextrose may be used.

2. Description of the Prior Art

Polydextrose is a water-soluble, low-calorie, non-cariogenic bulking agent which contributes the bulk and texture normally associated with sugars in many food products. Polydextrose is a randomly bonded glucose polymer prepared by polymerizing glucose and/or maltose by anhydrous melt polymerization techniques using nonvolatile, edible, organic polycarboxylic acids and polyols as catalysts, cross-linking agents and/or polymerization activators. Procedures for preparing Polydextrose are disclosed in U.S. Pat. Nos. 3,766,165 and 3,876,794, issued to Rennhard.

Polydextrose is a low-calorie sugar substitute (containing about 1 calorie/gram) which has many of the technological properties of sugar without the sweetness. This non-sweet bulking agent is especially useful when used in combination with high intensity sweeteners to provide low-calorie food products having the desirable texture of conventional sugar-containing food products without the calories associated with such products.

Polydextrose is commercially available in three forms: Polydextrose A, an amorphous, slightly acidic (pH of 2.5–3.5) fusible powder; Polydextrose N, a potassium hydroxide partially neutralized (pH of 5–6) light-colored 70% aqueous solution of Polydextrose A; and Polydextrose K, a potassium bicarbonate partially neutralized (pH of 5–6) powder form of Polydextrose A.

All of these Polydextrose products contain quantities of unreacted monomers, such as glucose, sorbitol, as well as citric acid, 1, 6-anhydroglucose (levoglucosan) and 5-hydroxymethylfurfural. For example, the amount of citric acid (or citric acid salts) present in Polydextrose is about 0.9%, by weight. The presence of these impurities gives Polydextrose a bitter off-taste and/or musty off-flavor and limits the quantity of Polydextrose which can be used as a bulking agent in food products.

Polydextrose has recently become available in a fourth form: Improved Polydextrose, a form of Polydextrose A which is substantially free of certain low molecular weight organic acids (pH of 3–4) wherein the acids are present in the bulking agent in an amount of less than about 0.3%, by weight. While removal of these low molecular weight acids helps to eliminate the off taste associated with Polydextrose, the absence of these acids in the bulking agent makes Improved Polydextrose difficult to handle. For example, Improved Polydextrose is a coarser material, and contains more static charge, than Polydextrose A. This increase in static charge presumably results from removing the low molecular weight organic acids from Polydextrose A which may act as static charge neutralizers or stabilizers.

Because of the coarseness of Improved Polydextrose, only a small amount of this form of Polydextrose can be added as a bulking agent to a foodstuff (for instance, only about 10–15% in a chewing gum composition) due to the gritty texture of the bulking agent and the resulting non-uniform distribution of the other components in the foodstuff. Furthermore, this coarse form of Improved Polydextrose cannot be readily pulverized into a fine form to permit larger amounts of Improved Polydextrose to be added to a foodstuff because of the static charge in the bulking agent.

Polydextrose Research Product Bulletin, Pfizer, Central Research, Groton, Connecticut (1981), p. 11 discloses that a chewing gum composition can be prepared by micronizing a mixture of Polydextrose A, sodium bicarbonate, sorbitol and an intense sweetener and then adding the milled mixture to a melted gum base mixture.

U.S. Pat. No. 4,382,963, issued to Klose et al. and assigned to General Foods Corporation, discloses a low-calorie, sugar-free chewing gum composition containing as the sole bulking agent Polydextrose N as a spray-dried powder.

U.S. Pat. No. 4,765,991, issued to Cherukuri et al. and assigned to Warner-Lambert Company, discloses a reduced calorie chewing gum composition comprising a high percentage of a non-styrene-butadiene copolymer/polyvinyl acetate elastomer chewing gum base and a small percentage of a polysaccharide selected from the group consisting of Polydextrose, polymaltose, modified Polydextrose, and mixtures thereof.

U.S. Pat. No. 4,622,233, issued to Torres, and U.S. patent application Ser. Nos. 043,793 and 193,961, both of which are assigned to Warner-Lambert Company, disclose methods for purifying Polydextrose.

While the above methods provide foodstuff compositions which contain some form of Polydextrose, none of the above disclosures has overcome the problem of providing a Polydextrose composition which is substantially free of low molecular weight organic acids and which is sufficiently fine in texture such that the Polydextrose composition can be used as the sole bulking agent. Thus it would be commercially advantageous to furnish a method for preparing pulverized substantially acid-free Polydextrose to provide a sugar substitute for foodstuff compositions. Such a method would permit a food product to contain only Polydextrose as the bulking agent without an off-taste or gritty texture and would result in a significant reduction in caloric intake. The present invention provides a method for preparing such an improved pulverized Polydextrose product without the disadvantages characteristic of previously known products. The pulverized Polydextrose product has improved taste and texture and may be used in a variety of sugarless and sugared reduced-calorie chewing gum compositions and food products. The present invention also pertains to methods for preparing sugarless and sugared chewing gum compositions and food products in which the inventive composition may be used.

SUMMARY OF THE INVENTION

The present invention pertains to a method for preparing pulverized Polydextrose having a particle size of under about 125 microns in diameter from Polydextrose which is substantially free of low molecular weight organic acids which comprises the steps of (a) admixing Polydextrose which is substantially free of low molecular weight organic acids with an anti-caking agent to form a mixture, and (b) pulverizing the mixture to form the pulverized Polydextrose. The pulverized Polydextrose may be used in a variety of chewing gum products and edible products. The present invention also pertains to methods for preparing the chewing gum and edible products in which the novel pulverized Polydextrose may be used.

BRIEF DESCRIPTION OF THE DRAWING

FIG. 1 depicts in graphic format the moisture absorption over a 5 week period of the chewing gum compositions of examples 7-10 at 27° C. and 80% R.H.

DETAILED DESCRIPTION OF THE INVENTION

The present invention pertains to a process for preparing pulverized Polydextrose having a particle size of under about 125 microns in diameter from Polydextrose which is substantially free of low molecular weight organic acids which comprises the steps of (a) admixing Polydextrose which is substantially free of low molecular weight organic acids with an anti-caking agent to form a mixture, and (b) pulverizing the mixture to form the pulverized Polydextrose.

Applicants have found that when Polydextrose, which is substantially free of low molecular weight organic acids, is mixed with an anti-caking agent, the coarse bulking agent can be pulverized to a form sufficiently fine in texture such that Polydextrose can be used as the sole bulking agent in food products without an off-taste and without a gritty texture. While the invention is not to be limited to theoretical considerations, applicants believe that the presence of the anti-caking agent in the substantially acid-free Polydextrose composition acts to neutralize or stabilize the static charge so that the coarse bulking agent can be pulverized to small particles having a size under about 125 microns in diameter.

Chewing gum compositions prepared with the inventive pulverized Polydextrose composition are less hygroscopic (have lower moisture-pickup) and less prone to becoming stale than conventional sugarless gum compositions while having comparable firmness and texture. Furthermore, the flavor of chewing gum products prepared with the inventive pulverized Polydextrose composition is more stable during storage than the flavor of chewing gum products prepared with Polydextrose A or nonpulverized Polydextrose which is substantially free of acids. For example, chewing gums containing peppermint flavoring agents are known to develop an offtaste upon aging because of oxidation of the flavoring agent. Peppermint flavored chewing gum compositions prepared with the inventive pulverized Polydextrose showed improved flavor stability presumably because the lower acid and moisture content of the bulking agent help to inhibit oxidation of the flavoring agent The Polydextrose starting material in the present invention is Polydextrose which is substantially free of low molecular weight organic acids and organic acid salts. In general, the concentration of low molecular weight organic acids in the inventive form of Polydextrose is less than about 0.3%, preferably less than about 0.2%, and more preferably less than about 0.1%, by weight. Moreover, substantially acid-free Polydextrose is a coarse material. In general, the particle size of substantially acid-free coarse Polydextrose is such that about only 35% of the particles are under about 125 microns in diameter.

Anti-caking agents useful in the present invention include calcium phosphate, calcium silicate, calcium stearate, cellulose, kaolin, magnesium carbonate, magnesium hydroxide, magnesium silicate (talc), magnesium stearate, silicon dioxide (marketed under the tradename SYLOID by W.R. Grace), sodium ferrocyanide, sodium silicoaluminate, sodium calcium silicoaluminate, sucrose esters, aluminum calcium silicates, and the like and mixtures thereof. In a preferred embodiment, the anti-caking agent is selected from the group consisting of SYLOID and cellulose. In a more preferred embodiment, the anti-caking agent is SYLOID.

The amount of anti-caking agent to be added to the Polydextrose is that amount of anti-caking agent necessary to reduce the static charge content of the substantially acid-free Polydextrose such that the Polydextrose can be pulverized to form particles where about 80% of the particles are under about 125 microns in diameter. In general, the amount of anti-caking agent to be added to the Polydextrose bulking agent will be in the range from about 0.1% to about 5%, preferably from about 0.5% to about 3%, and more preferably from about 1% to about 2%, by weight.

Diluents may optionally be included with the anti-caking agents of the present invention. Diluents (diluting agents) useful in the present invention include maltodextrin, sorbitol, maltitol, and the like, and mixtures thereof. As set out above for anti-caking agents, the amount of diluent to be added to the Polydextrose is that amount of diluent necessary to reduce the static charge content of the substantially acid-free Polydextrose such that the Polydextrose can be pulverized to form particles where about 80% of the particles are under about 125 microns in diameter.

In accord with the present invention, a pulverized Polydextrose product having a particle size of under about 125 microns in diameter may be prepared from Polydextrose which is substantially free of low molecular weight organic acids by admixing the substantially acid free Polydextrose with an anti-caking agent to form a mixture and pulverizing the mixture to form the pulverized Polydextrose.

The substantially acid-free Polydextrose composition may be pulverized or milled using standard techniques and equipment known to those skilled in the art. The apparatus useful in accordance with the present invention comprises milling apparatus well known in the confectionery manufacturing arts, and therefore the selection of the specific apparatus and the milling conditions will be apparent to the artisan.

In another embodiment, the present invention is directed at a pulverized Polydextrose composition which has a particle size of under about 125 microns in diameter prepared by a method which comprises the steps of (a) admixing Polydextrose which is substantially free of low molecular weight organic acids with an anti-caking agent to form a mixture, and (b) pulverizing the mixture to form the pulverized Polydextrose composition.

Once prepared, the substantially acid-free pulverized Polydextrose composition may be stored for future use or may be formulated with conventional additives, such as pharmaceutically acceptable carriers or confectionery ingredients to prepare a wide variety of edible compositions, such as foodstuffs, jellies, extracts, hard and soft confectionery products, pharmaceutical compositions administered orally, and chewing gums.

In a preferred embodiment, the edible composition comprises a pulverized Polydextrose composition which has a particle size of under about 125 microns in diameter wherein the Polydextrose is prepared by a method which comprises the steps of (a) admixing Polydextrose which is substantially free of low molecular weight organic acids with an anti-caking agent to form a mixture, and (b) pulverizing the mixture to form the pulverized Polydextrose composition.

The present invention extends to methods of making the ingestible compositions. In such a method, an edible composition comprising a pulverized Polydextrose composition which is substantially free of low molecular weight organic acids and which has a particle size of under about 125 microns in diameter is made by (a) admixing Polydextrose which is substantially free of low molecular weight organic acids with an anti-caking agent to form a mixture, (b) pulverizing the mixture from step (a) to form the pulverized Polydextrose composition, and (c) admixing the pulverized Polydextrose composition from step (b) into an edible composition. Other ingredients will usually be incorporated into the composition as dictated by the nature of the desired composition as well known by those having ordinary skill in the art. The ultimate ingestible compositions are readily prepared using methods generally known in the food technology and pharmaceutical arts.

An important aspect of the present invention pertains to improved chewing gum compositions which comprise (A) a gum base, (B) a pulverized Polydextrose composition, which is substantially free of low molecular weight organic acids and which has a particle size of under about 125 microns in diameter, (C) a softening agent, (D) a sweetening agent, and (E) a flavoring agent. The present invention also includes a method for preparing the improved chewing gum compositions, including both chewing gum and bubble gum formulations. The sugarless chewing gum compositions may be used in a variety of chewing gum products, such as sticks, slabs, chunks, balls, ropes, tablets, and center filled and confectionery coated gum products.

Another important aspect of the present invention pertains to an improved chewing gum composition which comprises (A) a gum base, (B) a pulverized Polydextrose composition, which is substantially free of low molecular weight organic acids and which has a particle size of under about 125 microns in diameter, (C) a softening agent, (D) a sweetening agent, and (E) a flavoring agent, wherein the pulverized Polydextrose composition is prepared by a method which comprises the steps of (a) admixing Polydextrose which is substantially free of low molecular weight organic acids with an anticaking agent to form a mixture, and (b) pulverizing the mixture to form the pulverized Polydextrose composition.

In one embodiment of the present invention, the inventive pulverized Polydextrose composition is employed in a chewing gum composition having a high gum base content. Preferably, the sugarless chewing gum compositions comprise, in percentages by weight of the total composition: (1) a gum base present in an amount from about 35% to about 85%, and (2) pulverized substantially acid-free Polydextrose present in an amount from about 15% to about 65%. In a more preferred embodiment, the sugarless chewing gum compositions of the present invention comprise, in percentages by weight of the total composition: (1) a gum base present in an amount from about 40% to about 75%, and (2) pulverized substantially acid-free Polydextrose present in an amount from about 25% to about 60%. In a most preferred embodiment, the sugarless chewing gum compositions of the present invention comprise, in percentages by weight of the total composition: (1) a gum base present in an amount from about 50% to about 65%, and (2) pulverized substantially acid-free Polydextrose present in an amount from about 35% to about 50%.

In another embodiment of the present invention, the inventive pulverized Polydextrose composition is employed in a chewing gum composition having a traditional (lower) gum base content. Preferably, the sugarless chewing gum compositions comprise, in percentages by weight of the total composition: (1) a gum base present in an amount from about 15% to about 35%, and (2) pulverized substantially acid-free Polydextrose present in an amount from about 65% to about 85%. In a more preferred embodiment, the sugarless chewing gum compositions of the present invention comprise, in percentages by weight of the total composition: (1) a gum base present in an amount from about 15% to about 30%, and (2) pulverized substantially acid-free Polydextrose present in an amount from about 70% to about 85%. In a most preferred embodiment, the sugarless chewing gum compositions of the present invention comprise, in percentages by weight of the total composition: (1) a gum base present in an amount from about 20% to about 30%, and (2) pulverized substantially acid-free Polydextrose present in an amount from about 70% to about 80%.

In the high gum base chewing gum compositions set out above, the softening agent is preferably present in an amount up to about 10%, more preferably from about 2% to about 6%, and most preferably from about 3% to about 5%, by weight of the total chewing gum composition. In the traditional gum base chewing gum compositions set out above, the softening agent is preferably present in an amount up to about 18%, more preferably from about 5% to about 15%, and most preferably from about 7% to about 12%, by weight of the total chewing gum composition.

In the high gum base and traditional gum base chewing gum compositions set out above, the sweetening agent is preferably present in an amount from about 0.001% to about 3%, more preferably from about 0.01% to about 1%, and most preferably from about 0.02% to about 0.5%, by weight of the total chewing gum composition. Similarly, the flavoring agent in the chewing gum compositions set out above is preferably present in the chewing gum compositions in an amount from about 0.02% to about 5%, more preferably from about 0.1% to about 2%, and most preferably from about 0.8% to about 1.8%%, by weight of the total chewing gum composition.

The gum base employed in the present invention will vary greatly depending upon various factors such as the type of base desired, the consistency of gum desired and the other components used in the composition to make the final chewing gum product. The gum base may be any water-insoluble gum base known in the art, and includes those gum bases utilized for chewing gums and bubble gums. Illustrative examples of suitable polymers in gum bases include both natural and synthetic elastomers and rubbers. For example, those polymers which are suitable as gum bases include, without limitation, substances of vegetable origin such as chicle, natural rubber, crown gum, nispero, rosidinha, jelutong, perillo, niger gutta, tunu, balata, guttapercha, lechi capsi, sorva, gutta kay, mixtures thereof and the like. Synthetic elastomers such as butadiene-styrene copolymers, polyisobutylene, isobutylene-isoprene copolymers, polyethylene, mixtures thereof, and the like, are particularly useful.

Suitable gum bases also include a non-toxic vinyl polymer, such as polyvinyl acetate and its partial hydrolysate, polyvinyl alcohol, and mixtures thereof. When utilized, the molecular weight of the vinyl polymer may range from about 2,000 up to, and including, about 94,000.

In the chewing gum compositions employing a high chewing gum base content, the chewing gum base in general will comprise (a) about 0.5% to about 20% of an elastomer, (b) about 10% to about 25% of a polyvinyl acetate having a medium molecular weight of about 35,000 to about 55,000, (c) about 4.5% to about 10% acetylated monoglyceride, (d) about 6% to about 10% of a wax having a melting point below about 60° C., and (e) the remaining amounts of material selected from the group consisting of an elastomer solvent, emulsifiers, plasticizers, fillers and mixtures thereof. Chewing gum compositions employing high levels of chewing gum bases are more fully described in U.S. patent application Ser. No. 939,918, filed December 10, 1986, which disclosure is incorporated herein by reference.

The amount of gum base employed will vary greatly depending upon various factors such as the type of base used, the consistency of the gum desired and the other components used in the composition to make the final chewing gum product. In general, the gum base will be present in amounts from about 15% to about 75%, by weight of the final chewing gum composition.

The gum base composition may contain conventional elastomer solvents to aid in softening the elastomer base component. Such elastomer solvents may comprise terpinene resins such as polymers of alphapinene or beta-pinene, methyl, glycerol or pentaerythritol esters of rosins or modified rosins and gums, such as hydrogenated, dimerized or polymerized rosins or mixtures thereof. Examples of elastomer solvents suitable for use herein include the pentaerythritol ester of partially hydrogenated wood or gum rosin, the pentaerythritol ester of wood or gum rosin, the glycerol ester of wood rosin, the glycerol ester of partially dimerized wood or gum rosin, the glycerol ester of polymerized wood or gum rosin, the glycerol ester of tall oil rosin, the glycerol ester of wood or gum rosin and the partially hydrogenated wood or gum rosin and the partially hydrogenated methyl ester of wood or rosin, mixtures thereof, and the like. The elastomer solvent may be employed in amounts from about 5% to about 75%, and preferably from about 45% to about 70%, by weight of the chewing gum composition.

The gum base may also include plasticizers or softeners such as lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, mixtures thereof, and the like. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. Such materials are incorporated into the gum base to provide a variety of desirable textures and consistency properties. Because of the low molecular weight of these ingredients, they are able to penetrate the fundamental structure of the gum base making it plastic and less viscous. These additional materials are generally employed in amounts up to about 18%, preferably in high chewing gum base compositions in amounts from about 5% to about 18%, and more preferably in amounts from about 10% to about 14%, by weight of the chewing gum composition.

In a preferred embodiment, the softening agent is anhydrous glycerin, such as the commercially available United States Pharmacopeia (USP) grade. Glycerin is a syrupy liquid with a sweet warm taste and has a sweetness of about 60% of that of cane sugar. Because glycerin is hygroscopic, it is important that the anhydrous glycerin be maintained under anhydrous conditions throughout the preparation of the chewing gum composition.

The gum base may also include effective amounts of mineral adjuvants such as calcium carbonate, magnesium carbonate, alumina, aluminum hydroxide, aluminum silicate, talc, tricalcium phosphate, dicalcium phosphate and the like, as well as mixtures thereof. These mineral adjuvants may serve as fillers and textural agents. These fillers or adjuvants may be used in the gum base in various amounts. Preferably the amount of filler, when used, will be present in an amount up to about 60%, by weight of the chewing gum composition.

A variety of traditional ingredients may be included in the gum base in effective amounts such as coloring agents, antioxidants, preservatives, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the chewing gum base.

The gum composition may include effective amounts of conventional additives selected from the group consisting of sweetening agents (sweeteners), plasticizers, softeners, emulsifiers, waxes, fillers, bulking agents (carriers, extenders), mineral adjuvants, flavoring agents (flavors, flavorings), coloring agents (colorants, colorings), antioxidants, acidulants, thickeners, mixtures thereof, and the like. Some of these additives may serve more than one purpose. For example, in sugarless gum compositions, a sweetener, such as sorbitol or other sugar alcohol or mixtures thereof, may also function as a bulking agent.

The plasticizers, softening agents, mineral adjuvants, coloring agents, waxes and antioxidants discussed above, as being suitable for use in the gum base, may also be used in the gum composition. Examples of other conventional additives which may be used include emulsifiers, such as lecithin and glyceryl monostearate, thickeners, used alone or in combination with other softeners, such as methyl cellulose, alginates, carrageenan, xanthan gum, gelatin, carob, tragacanth, locust bean, and carboxy methyl cellulose, acidulants such as malic acid, adipic acid, citric acid, tartaric acid, fumaric acid, and mixtures thereof, and fillers, such as those discussed above under the category of mineral adjuvants. The fillers, when used, may be utilized in an amount up to about 60%, by weight of the gum composition.

The bulking agent in the present invention is pulverized Polydextrose which is substantially free of low molecular weight organic acids and which has particle sizes under about 125 microns in diameter. In general, the bulking agent will be present in the chewing gum composition in amounts from about 15% to about 85%, by weight of the final chewing gum composition.

The sweetening agents (sweeteners) used may be selected from a wide range of materials including water-soluble sweeteners, water-soluble artificial sweeteners, water-soluble sweeteners derived from naturally occurring water-soluble sweeteners, dipeptide based sweeteners, and protein based sweeteners, including mixtures thereof. Without being limited to particular sweeteners, representative categories and examples include:

(a) water-soluble sweetening agents such as dihydrochalcones, monellin, steviosides, glycyrrhizin, dihydroflavenol, and sugar alcohols such as sorbitol, mannitol, maltitol, and L-aminodicarboxylic acid aminoalkenoic acid ester amides, such as those disclosed in U.S. Pat. No. 4,619,834, which disclosure is incorporated herein by reference, and mixtures thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6of -methyl-1,2,3-oxathiazine-4-one-2,2-dioxide (Acesulfame-K), the free acid form of saccharin, and the like;

(c) dipeptide based sweeteners, such as L-aspartic acid derived sweeteners, such as L-aspartyl-L-phenylalanine methyl ester (Aspartame) and materials described in U.S. Pat. No. 3,492,131, L-alpha -aspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, and the like;

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galacto -pyranosyl-alpha-D-fructofuranoside, or 4-chloro-4-deoxygalactosucrose; 4-chloro-4-deoxy-alpha-D-galacto -pyranosyl-1-chloro-1-deoxy-beta-D-fructo-furanoside, or 4,1'-dichloro-4,1'-dideoxygalactosucrose; 1',6'-dichloro 1',6'-dideoxysucrose; 4-chloro-4-deoxy-alpha-D-galacto pyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl -6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy -beta-D-fructofuranoside, or 4,6,1',6'-tetrachloro -4,6,1',6'-tetradeoxygalacto-sucrose; and 4,6,1',6'-tetrachloro-4,6,1',6'-tetradeoxy-sucrose; and (e) protein based sweeteners such as thaumaoccous danielli (Thaumatin I and II).

The intense sweetening agents of the present invention may be used in many distinct physical forms well known in the art to provide an initial burst of sweetness and/or a prolonged sensation of sweetness. Without being limited thereto, such physical forms include free forms, such as spray dried, powdered, and beaded forms, and encapsulated forms, and mixtures thereof.

In general, an effective amount of sweetener is utilized to provide the level of sweetness desired, and this amount will vary with the sweetener selected. The amount of sweetener will normally be present in amounts from about 0 001% to about 3%, by weight of the gum composition, depending upon the sweetener used. The exact range of amounts for each type of sweetener is well known in the art and is not the subject of the present invention.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in *Chemicals Used in Food Processing*, publication 1274, pages 63–258, by the National Academy of Sciences, may be used.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5heptenal, i.e., melonal (melon), 2,6-dimethyloctanal (green fruit), and 2-dodecenal (citrus, mandarin), cherry, grape, strawberry shortcake, mixtures thereof and the like.

The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

The amount of flavoring agent employed herein is normally a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5%, by weight of the gum composition. Preferably, the flavoring agent is present in amounts from about 0.1% to about 2%, and more preferably, the flavoring agent is present in amounts from about 0.8% to about 1.8%, by weight of the gum composition.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No.2, which is the disodium salt of 5,5-indigotindisulfonic acid. Similarly, the dye known as F.D.& C. Green No.1 comprises a triphenylmethane dye and is the monosodium salt of 4-[4-(N-ethyl-p-sulfoniumbenzylamino) diphenylmethylene]-[1-(N-ethyl -N -p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857-884, which text is incorporated herein by reference.

Suitable oils and fats usable in gum compositions include partially hydrogenated vegetable or animal fats, such as coconut oil, palm kernel oil, beef tallow, lard, and the like. These ingredients when used are generally present in amounts up to about 7%, and preferably up to about 3.5%, by weight of the gum composition.

The present invention extends to methods of making the improved sugarless chewing gum compositions. The improved chewing gum compositions may be prepared using standard techniques and equipment known to those skilled in the art. The apparatus useful in accordance with the present invention comprises mixing and heating apparatus well known in the chewing gum manufacturing arts, and therefore the selection of the specific apparatus will be apparent to the artisan.

In such a method, a chewing gum composition is made by admixing the inventive pulverized Polydextrose bulking agent composition with the other ingredients of the final desired chewing gum composition. Other ingredients will usually be incorporated into the composition as dictated by the nature of the desired composition as well known by those having ordinary skill the art. The ultimate chewing gum compositions are readily prepared using methods generally known in the food technology and chewing gum arts.

For example, a gum base is heated to a temperature sufficiently high to soften the base without adversely effecting the physical and chemical make up of the base. The optimal temperatures utilized may vary depending upon the composition of the gum base used, but such temperatures are readily determined by those skilled in the art without undue experimentation.

The gum base is conventionally melted at temperatures that range from about 60o C. to about 120° C. for a period of time sufficient to render the base molten. For example, the gum base may be heated under these conditions for a period of about thirty minutes just prior to being admixed incrementally with the remaining ingredients of the base such as the plasticizer, the softener, the inventive bulking agent, the sweetener, and/or fillers, coloring agents and flavoring agents to plasticize the blend as well as to modulate the hardness, viscoelasticity and formability of the base. Mixing is continued until a uniform mixture of gum composition is obtained. Thereafter the gum composition mixture may be formed into desirable chewing gum shapes.

In another embodiment, the invention is directed to a method for preparing a sugarless chewing gum composition which comprises the steps of (1) providing the following ingredients (A) a gum base, (B) a bulking agent comprising a pulverized Polydextrose composition, which is substantially free of low molecular weight organic acids and which has a particle size of under about 125 microns in diameter, (C) a softening agent, (D) a sweetening agent, and (E) a flavoring agent, (2) heating the gum base to a temperature from about 60° C. to about 120° C., (3) admixing the softening agent, sweetening agent, flavoring agent and bulking agent to the mixture of step (2) to form a uniform mixture, (4) allowing the uniform mixture to cool, and (5) forming the mixture into a chewing gum product.

Another important aspect of the present invention pertains to improved hard and soft confectionery compositions which comprise the inventive pulverized Polydextrose composition. The preparation of confectionery formulations is historically well known and has changed little through the years. Confectionery items have been classified as either "hard" confectionery or "soft" confectionery. The Polydextrose compositions of the present invention can be incorporated into confectionery compositions as a bulking agent by admixing the inventive composition into conventional hard and soft confections.

Confectionery material may include such exemplary substances as lozenges, tablets, toffee, nougat, suspensions, chewy candy, chewing gum and the like. The bulking agent is present in a quantity sufficient to bring the total amount of composition up to 100%.

Lozenges are flavored medicated dosage forms intended to be sucked and held in the mouth. Lozenges may be in the form of various shapes such as flat, circular, octagonal and biconvex forms. The lozenge bases are generally in two forms: hard, boiled candy lozenges and compressed tablet lozenges.

Hard boiled candy lozenges may be processed and formulated by conventional means. In general, a hard boiled candy lozenge has a base composed of a bulking agent kept in an amorphous or glassy condition. This amorphous or glassy form is considered a solid syrup generally having from about 0.5% to about 1.5% moisture. Further ingredients such as flavoring agents, sweetening agents, acidulants, coloring agents and the like may also be added.

Boiled candy lozenges may also be prepared from bulking agents comprising Polydextrose. The candy lozenges may contain up to about 95% bulking agent, by weight of the solid syrup component. Boiled candy lozenges may be routinely prepared by conventional methods such as those involving fire cookers, vacuum cookers, and scraped-surface cookers also referred to as high speed atmospheric cookers.

Fire cookers involve the traditional method of making a boiled candy lozenge base. In this method, the desired quantity of carbohydrate bulking agent is dissolved in water by heating the agent in a kettle until the bulking agent dissolves. Additional bulking agent may then be added and cooking continued until a final temperature of 145o C. to 156o C is achieved. The batch is then cooled and worked as a plastic-like mass to incorporate additives such as flavoring agents, coloring agents and the like.

A high-speed atmospheric cooker uses a heat-exchanger surface which involves spreading a film of candy on a heat exchange surface, the candy is heated to 65° C. to 170° C. in a few minutes. The candy is then rapidly cooled to 100° C. to 120° C. and worked as a plastic-like mass enabling incorporation of the additives, such as flavoring agents, coloring agents and the like.

In vacuum cookers, the carbohydrate bulking agent is boiled to 125° C. to 132° C., vacuum is applied and additional water is boiled off without extra heating. When cooking is complete, the mass is a semi-solid and has a plastic-like consistency. At this point, flavoring agents, coloring agents, and other additives are admixed in the mass by routine mechanical mixing operations.

The optimum mixing required to uniformly mix the flavoring agents, coloring agents and other additives during conventional manufacturing of boiled candy lozenges is determined by the time needed to obtain a uniform distribution of the materials. Normally, mixing times of from 4 to 10 minutes have been found to be acceptable.

Once the boiled candy lozenge has been properly tempered, it may be cut into workable portions or formed into desired shapes. A variety of forming techniques may be utilized depending upon the shape and size of the final product desired. A general discussion of the composition and preparation of hard confections may be found in H.A. Lieberman, *Pharmaceutical Dosage Forms: Tablets*, Volume 1 (1980), Marcel Dekker, Inc., New York, N.Y. at pages 339 to 469, which disclosure is incorporated herein by reference.

In contrast, compressed tablet confections contain particulate materials and are formed into structures under pressure. These confections generally contain bulking agents in amounts up to about 95%, by weight of the composition, and typical tablet excipients such as binders and lubricants as well as flavoring agents, coloring agents and the like.

In addition to hard confectionery materials, the lozenges of the present invention may be made of soft confectionery materials such as those contained in nougat. The preparation of soft confections, such as nougat, involves conventional methods, such as the combination of two primary components, namely (1) a high boiling syrup bulking agent, and (2) a relatively light textured frappe, generally prepared from egg albumin, gelatin, vegetable proteins, such as soy derived compounds, sugarless milk derived compounds such as milk proteins, and mixtures thereof. The frappe is generally relatively light, and may, for example, range in density from about 0.5 to about 0.7 grams/cc.

The high boiling syrup, or "bob syrup" of the soft confectionery is relatively viscous and has a higher density than the frappe component, and frequently contains a substantial amount of carbohydrate bulking agent. Conventionally, the final nougat composition is prepared by the addition of the "bob syrup" to the frappe under agitation, to form the basic nougat mixture. Further ingredients such as flavoring agents, additional carbohydrate bulking agent, coloring agents, preservatives, medicaments, mixtures thereof and the like may be added thereafter also under agitation. A general discussion of the composition and preparation of nougat confections may be found in B.W. Minifie, *Chocolate, Cocoa and Confectionery*: Science and Technology, 2nd edition, AVI Publishing Co., Inc., Westport, Conn. (1980), at pages 424–425, which disclosure is incorporated herein by reference.

The procedure for preparing the soft confectionery involves known procedures. In general, the frappe component is prepared first and thereafter the syrup component is slowly added under agitation at a temperature of at least about 65° C., and preferably at least about 100° C. The mixture of components is continued to be mixed to form a uniform mixture, after which the mixture is cooled to a temperature below 80° C., at which point, the flavoring agent may be added. The mixture is further mixed for an additional period until it is ready to be removed and formed into suitable confectionery shapes.

The confectionery compositions of this invention may also be in chewable form. To achieve acceptable stability and quality as well as good taste and mouth feel in a chewable formulation several considerations are important. These considerations include the flavoring agent employed, the degree of compressibility of the tablet and the organoleptic properties of the composition.

Chewable candy is prepared by procedures similar to those used to make soft confectionery. In a typical procedure, a boiled bulking agent syrup blend is formed to which is added a frappe mixture. The bulking agent syrup blend is heated to temperatures above about 120° C. to remove water and to form a molten mass. The frappe is generally prepared from gelatin, egg albumin, milk proteins such as casein, and vegetable proteins such as soy protein, and the like, which is added to a gelatin solution and rapidly mixed at ambient temperature to form an aerated sponge like mass. The frappe is then added to the molten candy mass and mixed until homogeneous at temperatures between about 65° C. and about 120° C.

The additional ingredients can then be added such as flavoring agents and coloring agents to the homogeneous mixture as the temperature is lowered to about 65° C.-95° C. The formulation is further cooled and formed into pieces of desired dimensions.

A general discussion of the lozenge and chewable tablet forms of confectionery may be found in H.A. Lieberman and L. Lachman, *Pharmaceutical Dosage Forms: Tablets*, Volume 1, Marcel Dekker, Inc., New York, N.Y. at pages 289 to 466, which disclosure is incorporated herein by reference.

In accordance with this invention, effective amounts of the Polydextrose bulking agent compositions of the present invention may be admixed into the hard and soft confections. These amounts are readily determined by those skilled in the art without the need for undue experimentation. In a preferred embodiment, the pulverized substantially acid-free Polydextrose composition will be present in the hard and soft confections in percentages by weight in an amount from about 5% to about 90%, more preferably in an amount from about 25% to about 80%, and most preferably in an amount from about 40% to about 70%. The optional additives are present in the confection in a quantity sufficient to bring the total amount of confection composition up to 100%.

The present invention extends to methods of making the improved hard and soft confection compositions. The bulking agent compositions may be incorporated into an otherwise conventional hard or soft confection composition using standard techniques known to those skilled in the art.

The apparatus useful in accordance with the present invention comprises cooking and mixing apparatus well known in the confectionery manufacturing arts, and therefore the selection of the specific apparatus will be apparent to the artisan.

The present invention is further illustrated by the following examples which are not intended to limit the effective scope of the claims. All parts and percentages in the examples and throughout the specification and claims are by weight of the final composition unless otherwise specified.

EXAMPLES 1-6

Noninventive Runs 1-4

Inventive Runs 5-6

These examples illustrate the particle size distribution of various commercially available forms of Polydextrose. These examples also demonstrate a comparison between prior art methods and the method according to the present invention for preparing pulverized substantially acid-free Polydextrose. The compositions of examples 1-6 are listed in Table 1.

TABLE 1

| Example | Ingredient |
|---|---|
| 1 | Polydextrose A |
| 2 | Polydextrose K |
| 3 | Improved Polydextrose |
| 4 | Milled Improved Polydextrose |
| 5 | Milled Improved Polydextrose with 1% syloid |
| 6 | Milled Improved Polydextrose with 2% cellulose |

The particle size distribution of the commercially available Polydextrose compositions of examples 1-3 are set out in Table 2. The compositions of examples 4-6 were milled (pulverized) in a Fritz Mill Model D, impact forward with hammers on high speed, at 4750 RPM. The particle size distribution (in percentages by weight of the total composition) of the compositions of examples 4-6 obtained after milling are also set out in Table 2.

TABLE 2

| PARTICLE SIZE DISTRIBUTION OF EXAMPLES 1-6* | | | | | | | |
|---|---|---|---|---|---|---|---|
| Sieve Mesh | Micron Size | EXAMPLE (Percentages By Weight) | | | | | |
| | | 1 | 2 | 3 | /4 | 5 | 6 |
| 30 | 590 | 1.7 | 1.1 | 0.8 | ** | 0 | 0 |
| 40 | 420 | 2.3 | 2.3 | 10.2 | | 0.7 | 0.3 |
| 60 | 250 | 7.4 | 8.9 | 27.9 | | 0.8 | 0.8 |
| 80 | 177 | 12.8 | 12.6 | 16.1 | | 2.6 | 4.7 |
| 100 | 149 | 7.3 | 6.5 | 3.8 | | 2.4 | 4.9 |
| 120 | 125 | 10.1 | 10.4 | 6.6 | | 5.2 | 9.2 |
| Pan | <125 | 58.4 | 58.2 | 34.6 | | 88.3 | 80.1 |

*ATM Sonic Sifter, Sifter Pulse For 10 minutes.
**Particles size distribution could not be determined because static charge caused the particles to cling to the sieve.

Table 2 shows that: (a) Polydextrose, substantially free of low molecular weight organic acids (example 3), is a coarser material than Polydextrose A (example 1) and Polydextrose K (example 2), (b) substantially acid-free Polydextrose cannot be successfully pulverized because of the high static charge content (example 4), and (c) when substantially acid-free Polydextrose is milled in the presence of an anti-caking agent (examples 5 and 6), particle sizes of the bulking agent can be obtained which are even smaller than the particle sizes available for Polydextrose A and Polydextrose K.

EXAMPLES 7-12

Noninventive Runs 7-9

Inventive Runs 10-12

Examples 7-12 demonstrate methods for preparing chewing gum compositions employing high amounts of chewing gum base. Specifically, examples 7-12 demonstrate a comparison of methods for preparing chewing gum compositions having as the bulking agent: sorbitol and mannitol (control, example 7), Polydextrose A (example 8), substantially acid-free Polydextrose (example 9), and pulverized substantially acid-free Polydextrose (examples 10-12). The chewing gum compositions of examples 7-12, in percentages by weight of the total composition, are set out in Table 3.

TABLE 3

| | Example | | | | | |
|---|---|---|---|---|---|---|
| Ingredient | 7 | 8 | 9 | 10 | 11 | 12 |
| | (Percentages By Weight) | | | | | |
| Gum Base | 65.0 | 65.0 | 65.0 | 65.0 | 65.0 | 80.0 |
| Sorbitol/Mannitol | 27.0 | — | — | — | — | — |
| Polydextrose A | — | 27.0 | — | — | — | — |
| Acid Free Polydextrose | — | — | 27.0 | — | — | — |
| Pulverized Acid Free Polydextrose | — | — | — | 27.0 | 32.0 | 12.0 |
| Softening Agent | 5.5 | 5.5 | 5.5 | 5.5 | 0.5 | 5.5 |
| Sweetening Agent | 0.5 | 0.5 | 0.5 | 0.5 | 0.5 | 0.5 |
| Flavoring Agent | 2.0 | 2.0 | 2.0 | 2.0 | 2.0 | 2.0 |

The texture and mouth feel of the chewing gum compositions of examples 7-12 were judged by an expert panel. The chewing gum composition of example 7 (sorbitol/mannitol, control) was judged to have good texture and mouth feel. The chewing gum composition of example 8 (Polydextrose A) was judged to have an off-taste. The chewing gum composition of example 9 (nonpulverized substantially acid-free Polydextrose) was judged to have improved taste over example 8 but the chewing gum compositions of both examples 8 and 9 were judged to be gritty. The chewing gum composition of example 10 (pulverized substantially acid-free Polydextrose) was judged to have good texture and mouth feel similar to the chewing gum composition of example 7. The chewing gum composition of example 11 (pulverized substantially acid-free Polydextrose), which contained only 0.5% softening agent, was judged to be smooth and have good texture. The chewing gum composition of example 12 (pulverized substantially acid-free Polydextrose), which contained 80% of a chewing gum base, was judged to have good texture and mouth feel similar to the chewing gum composition of example 7.

The flavor stability of the chewing gum compositions of examples 7–12 containing a peppermint flavoring agent were also judged by an expert panel after 12 weeks of storage. The chewing gum composition of example 7 (sorbitol/mannitol, control) was judged to have good flavor. The chewing gum composition of example 8 (Polydextrose A) was judged to have a somewhat bitter flavor. The chewing gum composition of example 9 (nonpulverized substantially acid-free Polydextrose) was also judged to have a somewhat bitter flavor. The chewing gum compositions of example 10 (pulverized substantially acid-free Polydextrose), example 11 (pulverized substantially acid-free Polydextrose), which contained only 0.5% softening agent, and example 12 (pulverized substantially acid-free Polydextrose), which contained 80% of a chewing gum base, were judged to have good flavor similar to the chewing gum composition of example 7.

The amount of moisture absorbed by the chewing gum compositions of examples 7–10 was measured over a period of five weeks at a temperature of 27° C. and a relative humidity (RH) of 80%. The amount of moisture absorbed, in percentage moisture absorbed by weight versus weeks of storage, is set out in Table 4 and in FIG. 1.

TABLE 4

| | MOISTURE ABSORPTION | | | | |
|---|---|---|---|---|---|
| | Week | | | | |
| Example | 1 | 2 | 3 | 4 | 5 |
| | Percentage Moisture Absorption By Weight | | | | |
| 7 | 7.11 | 8.12 | 8.63 | 11.68 | 11.68 |
| 8 | 2.66 | 6.38 | 6.38 | 6.38 | 6.91 |
| 9 | 3.09 | 4.64 | 5.15 | 5.15 | 6.19 |
| 10 | 2.30 | 4.60 | 4.60 | 5.75 | 5.75 |

FIG. 1 shows that the chewing gum composition which contained pulverized substantially acid-free Polydextrose as the bulking agent (example 10) absorbed significantly less moisture than the chewing gum compositions which contained as the bulking agent: sorbitol and mannitol (example 7), Polydextrose A (example 8) and nonpulverized substantially acid-free Polydextrose (example 9).

The degree of relative hardness of the chewing gum compositions of examples 7–10 was measured over a period of 12 weeks at a temperature of 23° C. and a relative humidity of 23%. Hardness was measured with an Instron Model 1130 durometer having a digital readout from Valtes Associates Inc. A 3/16 inch plunger was pressed against the surface of the gum until the surface was penetrated. The measurements, in pounds (lbs.) versus weeks of storage, are set out in Table 5.

TABLE 5

| | FIRMNESS | | | | |
|---|---|---|---|---|---|
| | Weeks | | | | |
| Example | 0 | 2 | 4 | 8 | 12 |
| 7 | 1.36 | 1.37 | 1.24 | 1.40 | — |
| 8 | 1.02 | 0.98 | 0.94 | 1.06 | — |
| 9 | 0.85 | 0.86 | 0.82 | 0.84 | — |
| 10 | 1.16 | 1.20 | 1.07 | 1.20 | — |

Table 5 shows that the chewing gum composition which contained pulverized substantially acid-free Polydextrose as the bulking agent (example 10) has comparable firmness to chewing gum compositions which contained as the bulking agent: sorbitol and mannitol (example 7), Polydextrose A (example 8) and unmilled substantially acid-free Polydextrose (example 9).

EXAMPLES 13–15

Noninventive Run 13

Inventive Runs 14–15

Examples 13–15 demonstrate methods for preparing chewing gum compositions employing low amounts of chewing gum base. Specifically, examples 13–15 demonstrate a comparison of methods for preparing chewing gum compositions having as the bulking agent: sorbitol and mannitol (control, example 13), pulverized substantially acid-free Polydextrose (example 14), and pulverized substantially acid-free Polydextrose and maltitol (example 15). The chewing gum compositions of examples 7–12, in percentages by weight of the total composition, are set out in Table 6.

TABLE 6

| | Example | | |
|---|---|---|---|
| | 13 | 14 | 15 |
| Ingredient | (Percentages By Weight) | | |
| Gum Base | 26.0 | 26.0 | 26.0 |
| Sorbitol/Mannitol | 61.0 | — | — |
| Pulverized Acid Free Polydextrose | — | 64.0 | 32.0 |
| Maltitol | — | — | 32.0 |
| Softening Agent | 11.0 | 8.0 | 8.0 |
| Sweetening Agent | 0.2 | 0.2 | 0.2 |
| Flavoring Agent | 1.8 | 1.8 | 1.8 |

The texture and mouth feel of the chewing gum compositions of examples 13–15 were judged by an expert panel. The chewing gum composition of example 13 (sorbitol/mannitol, control) was judged to have good texture and mouth feel. The chewing gum composition of example 14 (pulverized substantially acid-free Polydextrose) was judged to have good texture and mouth feel. The chewing gum composition of example 15 (pulverized substantially acid-free Polydextrose and maltitol) was judged to have good texture and mouth feel.

The invention being thus described, it will be obvious that the same may be varied in many ways. Such variations are not to be regarded as a departure from the spirit and scope of the invention and all such modifications are intended to be included within the scope of the following claims.

We claim:

1. A method for preparing pulverized Polydextrose substantially free of low molecular weight organic acids and having a particle size of under about 125 microns in diameter and exhibiting reduced moisture pickup and little or no grittiness, which comprises the steps of:
  (a) forming a mixture between Polydextrose which is substantially free of low molecular weight organic acids and is incapable of being pulverized to a particle size of under about 125 microns by conventional means, and from about 0.1% to about 5% by weight of the mixture of an anti-caking agent; and
  (b) pulverizing the mixture from step (a) to form a pulverized Polydextrose having particles the majority of which are under about 125 microns in diameter;
  (c) wherein said anti-caking agent stabilizes the static charge of said Polydextrose and thereby facilitates pulverization of the majority of said Polydextrose to the particle sizes of under about 125 microns in diameter.

2. The method according to claim 1, wherein the low molecular weight organic acids are present in the Polydextrose in an amount less than about 0.3%, by weight.

3. The method according to claim 1, wherein the anti-caking agent is selected from the group consisting of calcium phosphate, calcium silicate, calcium stearate, cellulose, kaolin, magnesium carbonate, magnesium hydroxide, magnesium silicate, magnesium stearate, silicon dioxide, sodium ferrocyanide, sodium silicoatluminate, sodium calcium silicoaluminate, sucrose esters, aluminum calcium silicates, and mixtures thereof.

4. A pulverized Polydextrose composition which is substantially free of low molecular weight organic acids, has a particle size of under about 125 microns in diameter and exhibits reduced moisture pickup and little or no grittiness, prepared by a method which comprises the steps of:
  (a) forming a mixture between Polydextrose which is substantially free of low molecular weight organic acids and incapable of being pulverized to a particle size of under about 125 microns by conventional means, and from about 0.1% to about 5% by weight of said mixture, of an anti-caking agent; and
  (b) pulverizing the mixture from step (a) to form the pulverized Polydextrose composition having particles the majority of which are under about 125 microns in diameter;
  (c) wherein said anti-caking agent stabilizes the static charge of said Polydextrose and thereby facilitates pulverization of the majority of said Polydextrose to the particle sizes of under about 125 microns in diameter, and
  wherein chewing gums may employ said polydextrose as the sole bulking agent.

5. The composition according to claim 4, wherein the low molecular weight organic acids are present in the Polydextrose in an amount less than about 0.3%, by weight.

6. The composition according to claim 4, wherein the anti-caking agent is selected from the group consisting of calcium phosphate, calcium silicate, calcium stearate, cellulose, kaolin, magnesium carbonate, magnesium hydroxide, magnesium silicate, magnesium stearate, silicon dioxide, sodium ferrocyanide, sodium silicoaluminate, sodium calcium silicoaluminate, sucrose esters, aluminum calcium silicates, and mixtures thereof.

7. An edible composition comprising a pulverized Polydextrose composition which is substantially free of low molecular weight organic acids, has a particle size of under about 125 microns in diameter and exhibits reduce moisture pickup and little or no grittiness, wherein the Polydextrose is prepared by a method which comprises the steps of:
  (a) forming a mixture between Polydextrose which is substantially free of low molecular weight organic acids and incapable of being pulverized to a particle size of under about 125 microns by conventional means, and from about 0.1% to about 5% by weight of the mixture of an anti-caking agent; and
  (b) pulverizing the mixture from step (a) to form the pulverized Polydextrose composition having particles the majority of which are under about 125 microns in diameter;
  (c) wherein said anti-caking agent stabilizes the static charge of said Polydextrose and thereby facilitates pulverization of the majority of said Polydextrose to the particle sizes of under about 125 microns in diameter, and
  wherein chewing gums may employ said polydextrose as the sole bulking agent.

8. The edible composition according to claim 7, wherein the low molecular weight organic acids are present in the Polydextrose in an amount less than about 0.3%, by weight.

9. The edible composition according to claim 7, wherein the anti-caking agent is selected from the group consisting of calcium phosphate, calcium silicate, calcium stearate, cellulose, kaolin, magnesium carbonate, magnesium hydroxide, magnesium silicate, magnesium stearate, silicon dioxide, sodium ferrocyanide, sodium silicoaluminate, sodium calcium silicoaluminate, sucrose esters, aluminum calcium silicates, and mixtures thereof.

10. A method for preparing an edible composition comprising a pulverized Polydextrose composition which is substantially free of low molecular weight organic acids, has a particle size of under about 125 microns in diameter and exhibits reduced moisture pickup and little or no grittiness, which comprises the steps of:
  (a) forming a mixture between Polydextrose which is substantially free of low molecular weight organic acids and incapable of being pulverized to a particle size of under about 125 microns by conventional means, and from about 0.1% to about 5% by weight of the mixture of an anti-caking agent;
  (b) pulverizing the mixture from step (a) to form the pulverized Polydextrose composition having particles the majority of which are under about 125 microns in diameter; and
  (c) admixing the pulverized Polydextrose composition from step (b) into an edible composition;
  (d) wherein said anti-caking agent stabilizes the static charge of said Polydextrose and thereby facilitates pulverization of said Polydextrose to the particle sizes of under about 125 microns in diameter, and
  wherein chewing gums may employ said polydextrose as the sole bulking agent.

* * * * *